N. S. BEEBE.
PAN LIFTER.
APPLICATION FILED JAN. 16, 1920.
1,431,560. Patented Oct. 10, 1922.
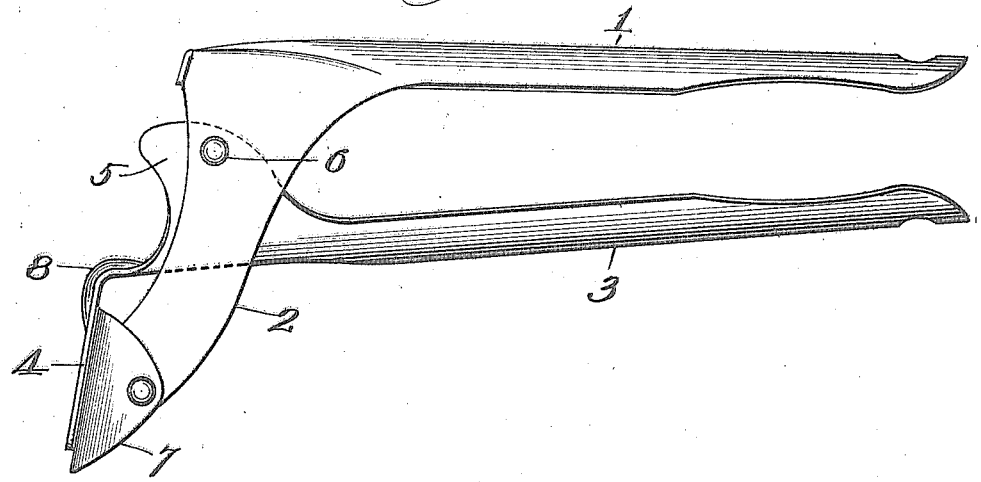
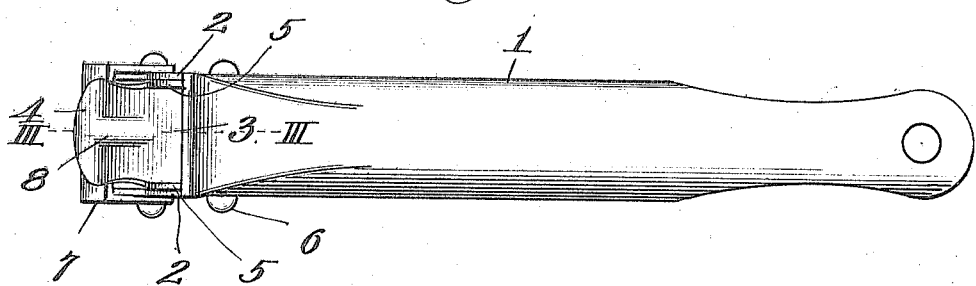
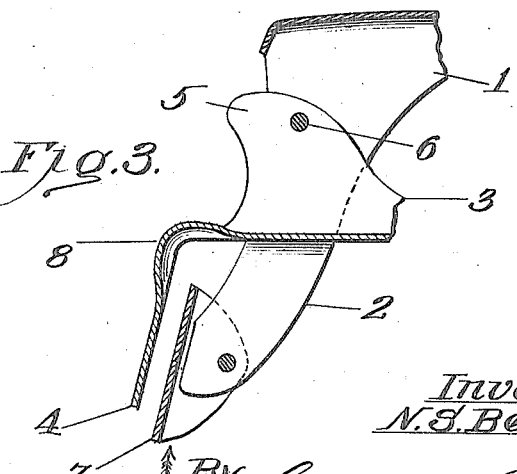
Inventor,
N. S. Beebe.

Patented Oct. 10, 1922.

1,431,560

UNITED STATES PATENT OFFICE.

NATHAN S. BEEBE, OF KANSAS CITY, MISSOURI, ASSIGNOR TO BERTHA N. BEEBE, OF KANSAS CITY, MISSOURI.

PAN LIFTER.

Application filed January 16, 1920. Serial No. 351,909.

*To all whom it may concern:*

Be it known that I, NATHAN S. BEEBE, a citizen of the United States, and resident of Kansas City, Jackson County, Missouri, have invented a certain new and useful Improvement in Pan Lifters, of which the following is a complete specification.

This invention relates to pan lifters and more especially to pan lifters of that type comprising two members pivoted together and provided with jaws for gripping the wall of a pan between them, and my object is to produce a pan lifter of this general type in which one of the jaws is equipped with a pivoted grip or sub-jaw, which, in conjunction with the opposite jaw, adapts the device for proper and secure engagement with any pan or pot irrespective of the thickness of the walls thereof. A further object it to produce a simple, strong and cheap device capable of lifting and holding a pan or pot of any weight which can be conveniently handled by one person.

To these ends the invention consists in certain novel and useful features of construction and combinations of parts as hereinafter described and claimed; and in order that it may be fully understood, reference is to be had to the accompanying drawing, in which:—

Figure 1, is a side elevation of a pan lifter embodying the invention.

Figure 2, is a plan view of the same.

Figure 3, is a vertical section on the line III—III of Figure 2.

By reference to the drawing, it will be seen that this pan lifter is of the conventional type in certain respects, that is, it comprises essentially two members pivoted together to provide handles at one side of the pivot, and at the opposite side jaws for gripping the object, one of the jaws having a self adjustable grip for adapting the device to pans or pots of different dimensions, that is, having walls of different thickness or cross sectional form.

In detail, 1 is a handle provided at its front end with depending parallel arms 2, and 3 is a handle fitting between said arms 2, and provided at its front end with a depending jaw 4, the handle 3 having upwardly projecting lugs 5 fitting flatly against the inner side of arms 2, and connected thereto pivotally by a cross pin 6, the arrangement being such that pressure applied on the handle by gripping the same in one's hand, causes the jaws to approach and tightly grip any object lying between them, such for example as a pan or pot. As the distance between the jaws varies the angle between them likewise varies and I have therefore provided the jaw composed of arms 2, with a pivoted grip 7 slightly bowed outwardly (see Figure 3), which will assume the angle of the surface it engages and thus co-operate with the jaw of the other handle in obtaining the widest possible grip on the pan or pot, it being noted by reference to Figure 3, that when pan or pot walls of different thickness are gripped, the angle between the jaw 4 and arms 2 varies, but that the pivoted grip automatically assumes the proper angle for most effective engagement with the surface of the wall with which it is engaged.

The pan or pot lifter as above described is preferably made of sheet metal stamped by suitable dies to proper form, and as the jaw 4 adapted to fit flatly against the inner side of a pan or pot, would be likely to bend under heavy strain, the said jaw and arms or handle 3 at their junction point are stiffened by producing at such point the corrugation 8 to form a stiffening rib.

In use, this device is fitted over the edge of a pan or pot with the jaw 4 within and the grip at the outer side of the wall of the pan or pot. Pressure is then applied by gripping the handles and this causes the jaw and pivoted grip to clamp upon the wall of the pan or pot so that the latter may be lifted and sustained without danger of slipping. If the pot is very heavy the operator can apply pressure upon the handles with both hands and thus have the benefit of both arms in the lifting and sustaining operation or in tilting the pan or pot to pour its contents into another vessel or dish.

From the above description, it will be apparent that I have produced a pan or pot lifter embodying the features of advantage set forth as desirable in the statement of the object of the invention and which may be modified in minor particulars without departing from the principle of construction and mode of operation involved.

I claim:

A sheet-metal pan lifter comprising a straight upper handle having, at one end, two parallel spaced arms extending downward, an outwardly bowed grip pivoted to the lower ends of and bridging the space between said arms, and a lower handle disposed in a plane between the horizontal planes occupied by the upper handle and the grip, and extending through the space between and pivoted to the said arms, said lower handle having a jaw extending downward and having its face opposite the face of the grip and formed with a stiffening rib around the exterior side of the corner formed at the junction of the lower handle with the said jaw.

In witness whereof I affix my signature.

NATHAN S. BEEBE.